United States Patent

Kozaki et al.

Patent Number: 5,848,370
Date of Patent: Dec. 8, 1998

[54] HYDRAULIC PRESSURE CONTROL APPARATUS FOR AUTOMATIC TRANSMISSION

[75] Inventors: Tetsuji Kozaki, Nagoya; Masami Fujitsuna, Kariya, both of Japan

[73] Assignee: Nippondenso Co., Ltd., Kariya, Japan

[21] Appl. No.: 614,950

[22] Filed: Mar. 11, 1996

[30] Foreign Application Priority Data

Apr. 3, 1995 [JP] Japan ................................ 7-077707

[51] Int. Cl.$^6$ ................................ B60K 41/08
[52] U.S. Cl. .................... 701/51; 701/60; 701/61; 477/155; 477/158
[58] Field of Search ............... 364/424.08, 424.089, 364/424.09, 424.093, 424.095; 477/143, 154, 155, 158, 162

[56] References Cited

U.S. PATENT DOCUMENTS

| | | | |
|---|---|---|---|
| 4,667,540 | 5/1987 | Yagi | 364/424.089 |
| 4,967,620 | 11/1990 | Shimanak | 477/155 |
| 4,972,738 | 11/1990 | Narita | 477/162 |
| 4,998,451 | 3/1991 | Sano | 477/163 |
| 5,063,814 | 11/1991 | Baba et al. | 364/424.088 |
| 5,421,791 | 6/1995 | Futawatari | 364/424.09 |
| 5,435,796 | 7/1995 | Fujita et al. | 477/154 |
| 5,513,104 | 4/1996 | Tsutsui et al. | 364/424.089 |

FOREIGN PATENT DOCUMENTS

| | | |
|---|---|---|
| 62-246653 | 10/1987 | Japan . |
| 2543402 | 10/1996 | Japan . |

*Primary Examiner*—Tan Q. Nguyen
*Attorney, Agent, or Firm*—Pillsbury Madison & Sutro LLP

[57] ABSTRACT

In order to precisely determines the time to start feedback control of line pressure during a shifting period, a shift control computer calculates an effective gear ratio $Ge=Nt/Nos$ at the time of an shift instruction based on input shaft rotational speed $Nt$ and detected vehicle speed $Nos$ and then calculates a parameter $F=Nos \times Ge-Nt$ indicating the point to start feedback control based on the input shaft rotational speed $Nt$, the detected vehicle speed $Nos$ and the effective gear ratio $Ge$. By comparing the calculated parameter $F$ with a predetermined value $\Delta Nt$, hydraulic pressure at the start of shift operation is maintained if $F < \Delta Nt$ and, if $F \geq \Delta Nt$, feedback control is performed to cause the input shaft rotational speed $Nt$ to vary in a predetermined manner.

9 Claims, 8 Drawing Sheets

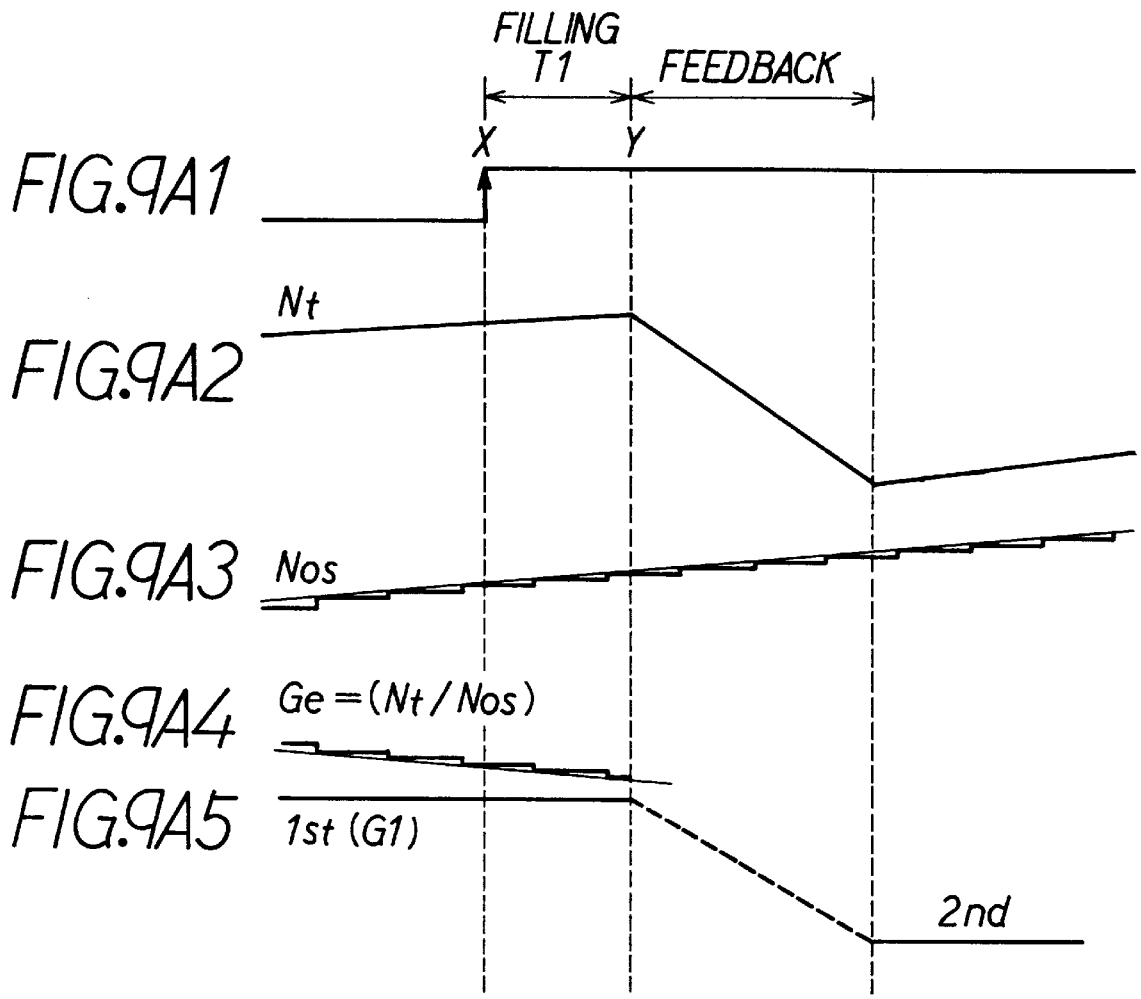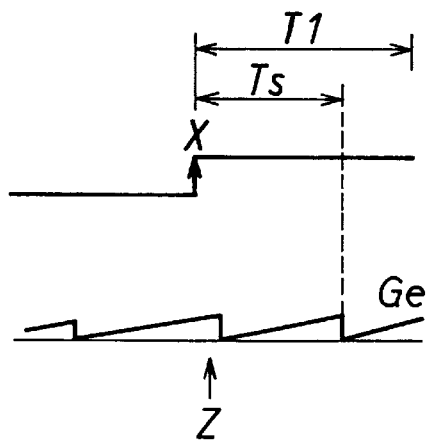

HYDRAULIC PRESSURE CONTROL APPARATUS FOR AUTOMATIC TRANSMISSION

BACKGROUND OF THE INVENTION

1. Field of the Invention

The present invention relates to an apparatus for appropriately controlling line pressure during a shifting period in order to reduce shocks occurring during the shifting operation for an automatic transmission.

2. Description of Related Art

To shift gear position from one to another in a speed change gear unit, a typical automatic transmission selectively operates various friction elements (such as clutch or brake devices) of a speed change gear mechanism, that is, changes the operating friction elements, by selectively varying hydraulic line pressures on the elements.

During shifting periods, the line pressures must be controlled to appropriate levels. If too high line pressure is applied to a friction element for shift operation, the transitional coupling capacity of the friction element will become excessively large, causing a severe shift shock. If too low line pressure is provided, the transitional coupling capacity of the friction element will become excessively small, causing an undesirably increased slippage of the friction element, which will shorten the service life of the transmission.

For line pressure control, conventional transmission apparatuses employ a feedback control method that causes the change of the rotational speed of the transmission input shaft to become substantially equal to a target value by using a pressure changing mechanism, such as a duty solenoid, to control line pressures.

It is desired for appropriate line pressure control that the feedback control of line pressure during shifting periods be started at a time point substantially the same as the time point at which a friction element to be operated starts to engage by its pressure chamber being filled with hydraulic fluid, that is, the time point at which the gear ratio starts to shift from the gear ratio of the currently selected speed change gear unit to the gear ratio of the speed change gear unit to be selected.

To perform such desired operation, U.S. Pat. No. 4,667,540 (Japanese Examined Patent Application Publication No. SHO 63-54937), as for example, proposes a technology for starting the feedback control at the timing when the change of the engine speed occurring after the starting of shift operation becomes equal to a target speed change.

However, the time amount from the switching of the shift control solenoid to the starting of feedback control varies because of variations in the capacity of hydraulic pressure chambers or the characteristics of line pressure controlling duty solenoids, or changes of the viscosity of hydraulic fluid caused by temperature changes. Therefore, it is difficult to determine the time point when the engagement is started (that is, the time point to start the feedback control). Thus, the aforementioned technology is not sufficient.

Under ideal conditions, a time point may be determined on the basis of the rotational speed Nt of the input shaft of an automatic transmission, the rotational speed No of the output shaft thereof, and the mechanical gear ratio G1 (=Nt/No) of the speed change gear unit that is in operation before shift operation, by using equation (1):

$$No \times G1 - Nt \geq 0 \tag{1}$$

The time point thus determined is the time point at which the gear ratio starts to shift (since up-shift is considered herein, the gear ratio is reduced by shifting), that is, the time point to start the feedback control.

However, rotation sensors of input and output shafts normally used cannot provide the ideal conditions because they cause the following problems.

Normally, high precision sensors are required for detection of an input shaft rotational speed because the sensor output is used for various precise controls. On the other hand, relatively low precision vehicle speed sensors, for example, a vehicle speed sensor that outputs only about 4 pulses per rotation, are used for detection of an output shaft rotational speed because the sensor output is used merely by the speedometer. The long-intervaled pulse output from the vehicle sensor makes it impossible or difficult to precisely detect the vehicle speed (that is, output shaft rotational speed) when the vehicle speed is changing with time, particularly in a low vehicle speed operational region.

Furthermore, the low precision vehicle speed sensor does not necessarily output pulses at a constant frequency even if the vehicle is traveling at a constant speed. This necessitates a processing by a low-pass filter, which may instantaneously provide a vehicle speed value that is considerably smaller than the actual speed. Thus, the problem of imprecise vehicle speed detection is worsened.

Imprecise vehicle speed detection makes it impossible to precisely determine the point to start feedback control despite the use of equation (1), resulting in failure of appropriate feedback control of line pressure.

To overcome this problem, a high precision vehicle speed sensor may be used instead of a low precision vehicle speed sensor. However, employment of a high precision vehicle speed sensor solely for the line pressure feedback control will be an unreasonable cost increase and thus not a desirable solution.

SUMMARY OF THE INVENTION

The present invention is intended to overcome the above-stated problems.

It is an object of the present invention to provide a shifting period hydraulic pressure control apparatus for an automatic transmission that precisely determines the starting point of line pressure feedback control during shift operation.

According to the present invention, a control apparatus detects a rotational speed Nt of the input shaft and a rotational speed No of the output shaft of a speed change gear mechanism, and accordingly instructs that shifting be started. The apparatus then determines an effective gear ratio Ge at the time of instruction to start the shifting, on the basis of the input shaft rotational speed Nt and the output shaft rotational speed No. Based on the effective gear ratio Ge, the apparatus determines the time point to start feedback control during the shifting period.

In short, the control apparatus calculates the effective gear ratio Ge based on the ratio Nt/No between the input shaft rotational speed Nt and the output shaft rotational speed No detected at the time of instruction to start shift operation, instead of the mechanically determined gear ratio. Based on the effective gear ratio Ge, the apparatus determines the time point to start the shifting period control, that is, the time point when the gear ratio is changed from the current value to the target value by shift operation.

With this construction, the control apparatus does not require a high precision sensor to detect rotational speed of the output shaft of the speed change gear mechanism, but can employ a low-cost vehicle speed sensor for a speedometer to accurately detect the transitional conditions where speed change gear units are being switched.

More specifically, while using the same type of vehicle speed sensor, the control apparatus will precisely determine the time point to start feedback control on the basis of the effective gear ratio Ge which is determined based on the gear ratio Nt/No determined by using the input shaft rotational sensor and the output shaft rotational sensor (that is, the vehicle speed sensor). More precisely, the effective gear ratio Ge is determined to a certain value representing variations of the gear ratio Nt/No occurring at predetermined timing.

Thus, the control apparatus has the advantage of appropriately starting the feedback control during a period when the gear ratio is changed by shift operation, while requiring no additional rotation sensor of the output shaft of the speed change gear mechanism specifically provided for the feedback control but using, for instance, the low-cost vehicle speed sensor provided for the speedometer.

It is preferred to determine the time point to start feedback control to the time when the value obtained by subtracting the input rotational speed Nt from the product of the output shaft rotational speed No and the effective gear ratio Ge, that is, No×Ge−Nt, becomes greater than or equal to a predetermined value. If the predetermined value is a value ΔNt that will eliminate the effect of noise, the control apparatus can determine the time point to start feedback control without being affected by noise (electric noise or data fluctuation).

It is also preferred to determine the effective gear ratio Ge to the minimum value of the gear ratio Nt/No that is continually and repeatedly calculated on the basis of the input shaft rotational speed Nt and the output shaft rotational speed No during a predetermined period following the start of shift operation caused by the shift starting instruction. This preferred construction will determine the effective gear ratio Ge with higher precision and thus determine the time point to start feedback control more precisely.

In still another preferred construction, the control apparatus determines the effective gear ratio Ge to the mean value of the gear ratio Nt/No that is repeatedly calculated on the basis of the input shaft rotational speed Nt and the output shaft rotational speed No during a predetermined period following the start of shift operation caused by the shift starting instruction. This construction smoothes out the variations of the effective gear ratio Ge provided by the repeated calculation, and thus can determine the time point to start feedback control with considerable stability.

BRIEF DESCRIPTION OF THE DRAWINGS

The foregoing and further objects, features and advantages of the present invention will become apparent from the following description of preferred embodiments with reference to the accompanying drawings, wherein:

FIGS. 9A1 to 9A5, 9B1 and 9B2 are timing charts illustrating the conditions of shift operation according to Embodiment 2;

DETAILED DESCRIPTION OF PRESENTLY PREFERRED EMBODIMENTS

Preferred embodiments of the present invention is described below with reference to the accompanying drawings.

(Embodiment 1)

Figure 1:
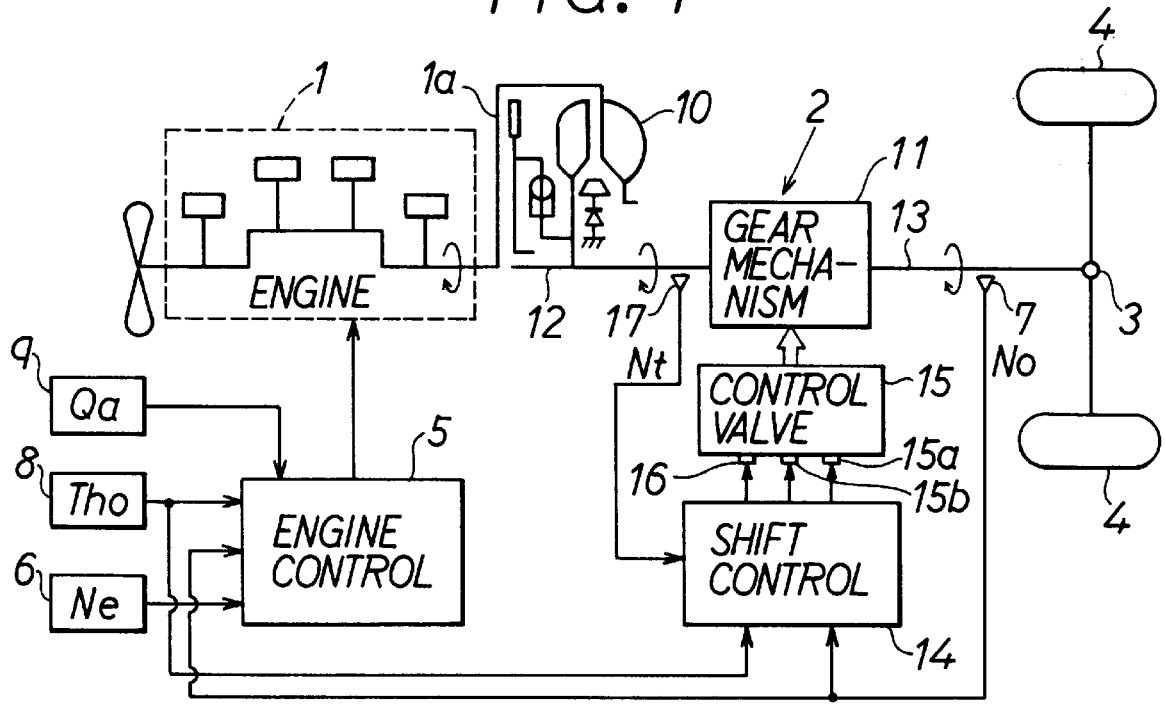
FIG. 1 is a schematic diagram illustrating the overall construction of an automatic transmission control system incorporating a control apparatus according to Embodiment 1.

FIG. 1 illustrates the overall construction of an automatic transmission control system incorporating a control apparatus for hydraulic pressure feedback control during a shifting period.

As shown in FIG. 1, a vehicle installed engine 1 is electronically controlled and connected to drive wheels 4 by an automatic transmission (AT) 2 and a differential gear unit 3.

The engine 1 is provided with an engine control computer 5 that receives signals from an engine speed sensor 6 for detecting engine speed NE, a vehicle speed sensor 7 for detecting vehicle speed (the rotational speed No of the output shaft of the automatic transmission 2), a throttle sensor 8 for detecting throttle valve opening Tho of the engine 1, and an intake air flow sensor 9 for detecting the amount of intake air flow Qa.

The engine control computer 5 determines an amount of fuel to be injected on the basis of the information thus inputted thereto, and accordingly outputs an instruction to the engine 1, specifically to fuel injectors (not illustrated). The computer 5 also outputs an ignition signal to the engine 1, specifically to ignition plugs (not illustrated). In accordance with the instructions, the fuel injectors and ignition plugs supply fuel and cause combustion as the engine 1 rotates while the driving and controlling of the engine 1 is performed.

The automatic transmission 2 comprises a torque converter 10 and a speed change gear mechanism 11. The drive force produced by the engine 1 is transmitted from an engine output shaft 1a to the toque converter 10 and then to an input shaft 12 of the speed change gear mechanism 11. The transmission input rotation of the input shaft 12 is then transmitted to an output shaft 13 while the rotational speed is changed in accordance with a selected speed change gear unit of the speed change gear mechanism 11. The drive force is then transmitted from the output shaft 13 to the drive wheels 4 by the differential gear unit 3, thus driving the motor vehicle.

Figure 2:
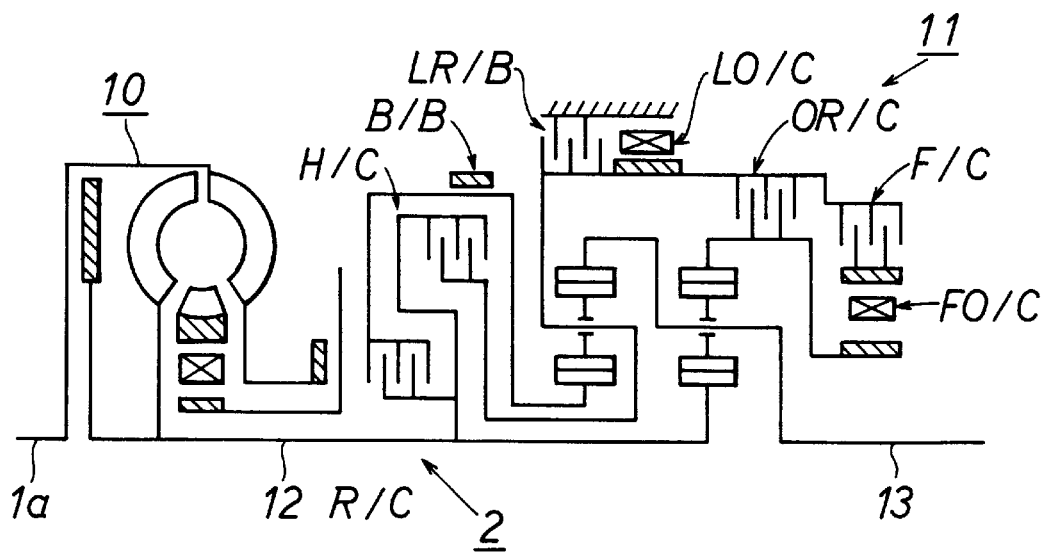
FIG. 2 is a schematic diagram illustrating the construction of an automatic transmission.

The automatic transmission 2 may be of the type shown in FIG. 2 and will not be described in detail because it is well known. Briefly, the speed change gear mechanism 11 incorporates various friction elements, such as clutches (reverse clutch R/C, high clutch H/C, low one-way clutch LO/C, overrun clutch OR/C, forward clutch F/C, forward one-way clutch OF/C) and brakes (band brake B/B, low reverse brake LR/B), that determine the transmission route (speed change gear unit) between the input shaft 12 and the output shaft 13.

As illustrated in FIG. 1, the speed change gear mechanism 11 is connected to a control valve 15 that is operated in accordance with an instruction from a shift control computer 14. The control valve 15 is caused to supply an appropriate hydraulic pressure, and the hydraulic pressure is led onto the friction elements as required.

The control valve 15 comprises two shift control solenoids 15a, 15b that switches hydraulic pressure lines corresponding to each speed change gear unit in accordance with the instruction from the shift control computer 14, and a line pressure control solenoid 16 that controls or changes the magnitude of hydraulic pressure.

Although the two shift control solenoids 15a, 15b are employed according to this embodiment, the number of shift control solenoids may be increased in accordance with the type and arrangement of speed change gear units or the internal construction of the control valve 15. An additional solenoid for adjusting the timing of rapidly charging and discharging hydraulic fluid during a shifting period may also be provided. In addition, although the line pressure control solenoid 16 is a duty-controlled solenoid according to the embodiment, a linear solenoid or other type of device may be employed to variably regulate the hydraulic pressure.

The shift control computer 14 is constituted by a microcomputer comprising a CPU, a ROM, a RAM and an I/O device (not shown) in the known manner. The shift control computer 14 receives signals from an input shaft rotational speed sensor 17 for detecting the rotational speed Nt of the input shaft 12, in addition to signals the from the vehicle speed sensor 7 and throttle sensor 8.

Figure 3A:
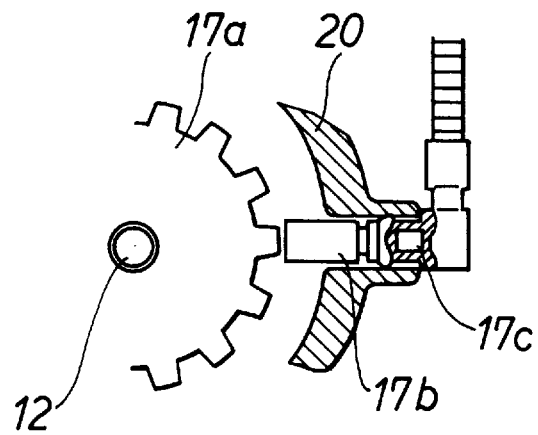
FIGS. 3A to 3C illustrate the construction of an input shaft rotation sensor.
Figure 3B:
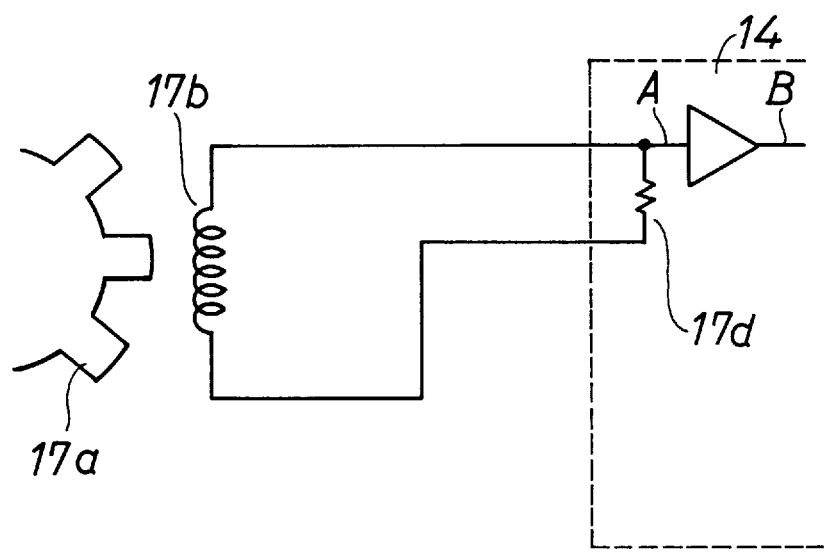
Figure 3C:
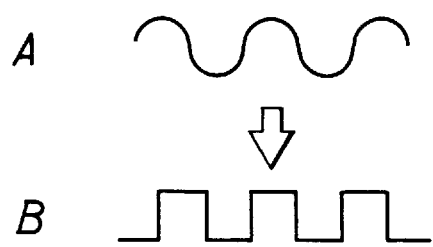
Figure 4:
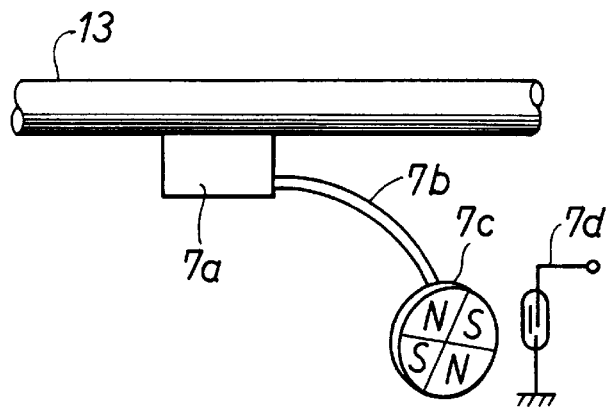
FIG. 4 illustrates the construction of a vehicle speed sensor.

The input shaft rotational speed sensor 17 may be any type of sensor that has a magnetic or optical arrangement and generates a pulse signal proportional to the rotational speed Nt of the input shaft 12. According to this embodiment, the input shaft rotational speed sensor 17 is a sensor employing a magnet pickup arrangement as illustrated in FIGS. 3A to 3C. More specifically, the input shaft rotational speed sensor 17 comprises a sensor gear 17a provided on the input shaft 12, a coil 17b mounted on a case 20 that contains the entire body of the automatic transmission 2, and a magnet 17c, as shown in FIG. 3A.

As the sensor gear 17a of the input shaft rotational speed sensor 17 rotates together with rotation of the input shaft 12, the teeth and intervals of the gear 17a change the magnetic resistance and accordingly changes the magnetic flux penetrating the coil 17b, thus generating a.c. power between the two ends of the coil 17b. A resistor 17d provided at the input of the I/O device of the shift control computer 14 as shown in FIG. 3B provides voltage A of sine waves having a frequency that is proportional to the rotational speed Nt of the input shaft 12 as shown in FIG. 3C. Then, a value proportional to the rotational speed of the input shaft 12 can be obtained by leading the sine wave voltage A through a threshold circuit to provide pulses B and measuring the frequency of the pulses B. According to the embodiment, 32 signal pulses are generated for one rotation of the input shaft 12. Of course, lower number of signals, e.g., 16 pulses per rotation for example, may be used instead.

On the other hand, the vehicle speed sensor 7 for detecting the rotational speed of the output shaft 13 of the speed change gear mechanism 11 may also have a magnetic or optical arrangement. According to this embodiment, the vehicle speed sensor 7 is a sensor typically used to detect vehicle speed No for indication on the speedometer.

Figure 5:
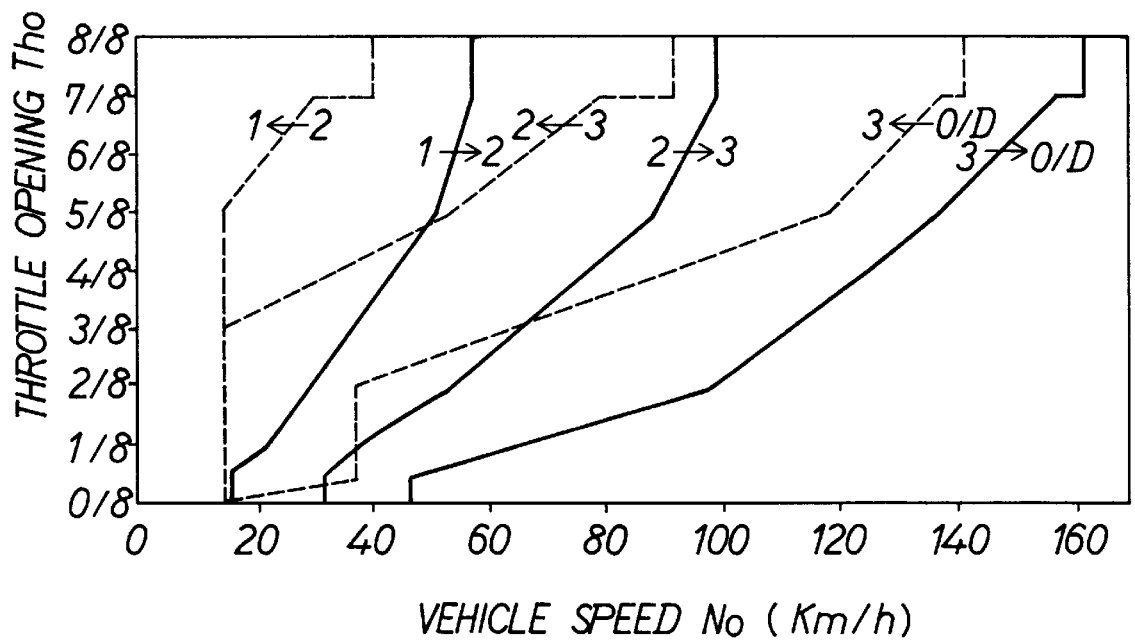
FIG. 5 is a graph indicating the shift-up and shift-down operations of the transmission.

The vehicle speed sensor 7 transmits the rotation of the output shaft 13 of the speed change gear mechanism 11 to a speedometer cable 7b by a speed reducing mechanism 7a, as shown in FIG. 5. The speed reduction mechanism 7a is designed such that the cable 7b rotates at 637 rpm when the vehicle is traveling at 60 km/h.

The cable 7b is connected at its other end to a magnetized disc 7c that has alternately arranged north and south poles. A reed switch 7d is disposed close to the disc 7c. During one rotation of the disc 7 (that is, one rotation of the cable 7b), the reed switch 7d is switched on/off four times. The vehicle speed can be detected on the basis of the on-off frequency of the reed switch 7d.

The shift control by the shift control computer 14 will be described with reference to the graph of FIG. 5.

The shift control computer 14 determines which of the speed change gear ranges of the shift diagram (predetermined in accordance with the throttle valve opening and the vehicle speed) the current operating conditions are in, on the basis of the signals from the vehicle speed sensor 7 and the throttle valve opening sensor 8, and determines the speed change gear unit to select, as indicated in FIG. 5. The shift diagram employs different criteria lines for up-shifts from the nth (n=1, 2, 3) speed gear unit to the (n+1)th speed gear unit and for down-shifts from the mth (m=2, 3, 4) speed gear unit to the (m−1)th speed gear unit, as indicated by solid lines (up-shift) and broken lines (down-shift).

Depending on the determination based on the diagram of FIG. 5, the energization/deenergization of the two shift control solenoids 15a, 15b is performed, for example, as shown in Table 1 below.

TABLE 1

| Gear | Solenoid 15a | Solenoid 15b |
| --- | --- | --- |
| 1st | ON | OFF |
| 2nd | ON | ON |
| 3rd | OFF | ON |
| 4th | OFF | OFF |

The control valve 15 is driven by controlling energization of the shift control solenoids 15a, 15b so as to determine the hydraulic pressure acting on the friction elements provided in the speed change gear mechanism 11. The clutches and brakes are accordingly operated to keep a speed change gear unit in position or shift to another gear unit.

Figure 6A:
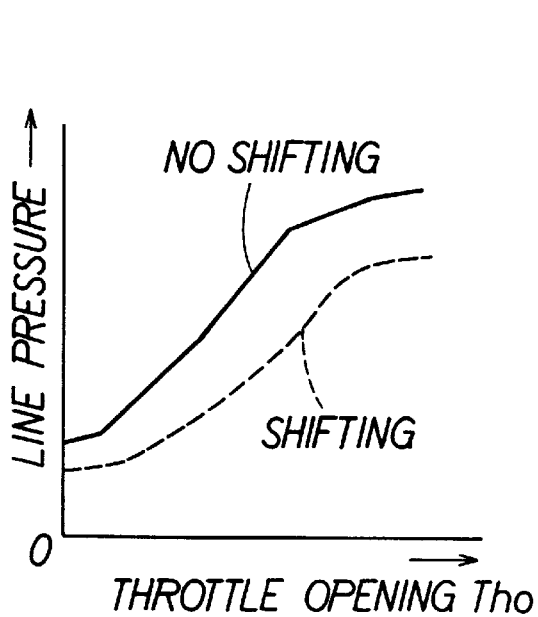
FIGS. 6A and 6B indicate map data for determining a line pressure based on the throttle opening and for determining a duty value based on the line pressure, respectively.

The shift control computer 14 also controls the line pressure control solenoid 16 in the following manners (1) and (2):

(1) In the steady state where gear shift is not performed, the shift control computer 14 provides hydraulic pressure (line pressure) determined by a map based on the throttle valve opening Tho as indicated in FIG. 6A. More specifically, the computer 14 determines a required line pressure in accordance with the signal from the throttle sensor 8 by using the map of FIG. 6A. Then, using a map indicated in FIG. 6B, the computer 14 converts the line pressure into a duty value. The computer 14 drives the line pressure control solenoid 16 in accordance with the duty value to achieve the target line pressure. It should be understood that the maps of FIGS. 6A, 6B may be combined to determine a duty value directly from the throttle valve opening Tho.

(2) If the determination regarding shift operation based on the diagram of FIG. 5 requires shift to another gear unit, the shift control computer 14 controls the line pressure solenoid 16 to adjust the line pressure so as to reduce shift shock with controlling the energizing of the shift control solenoids 15a, 15b.

This manner of control will be described in conjunction with up-shift. The shift control computer 14 controls the line pressure starting with an initial hydraulic pressure predetermined depending on the selected speed change gear unit, the throttle valve opening Tho, the torque produced by the engine 1, or the torque occurring at the input shaft 12. Following this phase, the computer 14 changes the line pressure by the feedback control so as to change the rotational speed Nt of the input shaft 12 predetermined such that the torque change of the output shaft 13 will become a predetermined pattern. An example of the setting of the initial hydraulic pressure based on the throttle valve opening Tho is indicated in FIG. 6A.

Preferably, the line pressure feedback control performed during the shifting periods should be started precisely at the time point at which a friction element to be operated is started to engage by its pressure chamber being filled with hydraulic fluid, that is, the time point at which the gear ratio starts to shift from the gear ratio of the currently selected speed change gear unit to the gear ratio of the gear unit to be selected next.

Figure 6B:
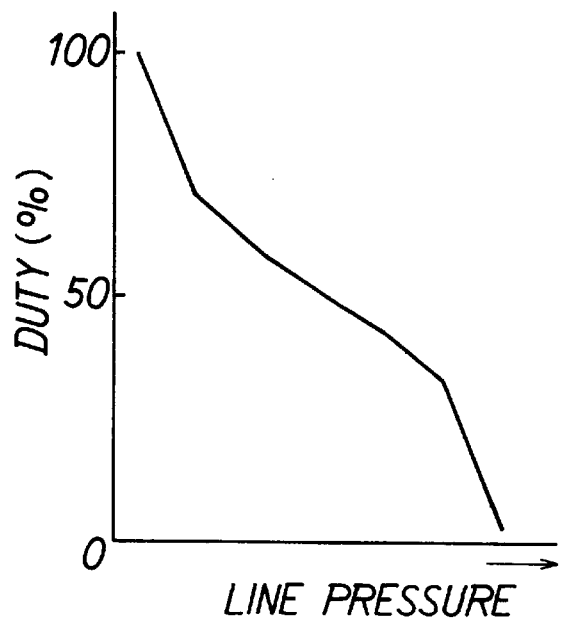

However, the duration from the switching of the shift control solenoids 15a, 15b to the starting of the feedback control varies because of viscosity changes of the hydraulic fluid caused by temperature changes or variations of the capacity of hydraulic pressure chambers or the solenoid characteristics as indicated in FIG. 6B. Therefore, the operation to determine the starting point of line pressure feedback control is required.

Under ideal conditions, the time point can be determined on the basis of the rotational speed Nt of the input shaft 12, the rotational speed No of the output shaft 13, and the mechanical gear ratio G1 (=Nt/No) of the speed change gear unit that is in operation before shift operation. More specifically, the time point at which the value No×G1−Nt deviates from zero to a positive value is determined as the starting point. That is, the time point thus determined is the time point at which the gear ratio is started to shift by shifting operation (since up-shift is considered herein, the gear ratio is reduced by shifting). However, the employment of the input shaft rotational speed sensor 17 and the vehicle speed sensor 7, that is, the rotational speed sensor of the output shaft 13, causes the following problems.

Since the pulses from the vehicle sensor 7 are spaced by long time interval, it is impossible or difficult to precisely detect the vehicle speed (that is, the rotational speed of output shaft 13) when the vehicle speed is changing with time, particularly in a low vehicle speed operational region. Furthermore, the low precision vehicle sensor 7 does not necessarily output pulses at a constant frequency even if the vehicle is traveling at a constant speed. This necessitates the processing by a low-pass filter, which may instantaneously provide a vehicle speed measurement Nos that is considerably smaller than the actual vehicle speed No.

Figure 7:
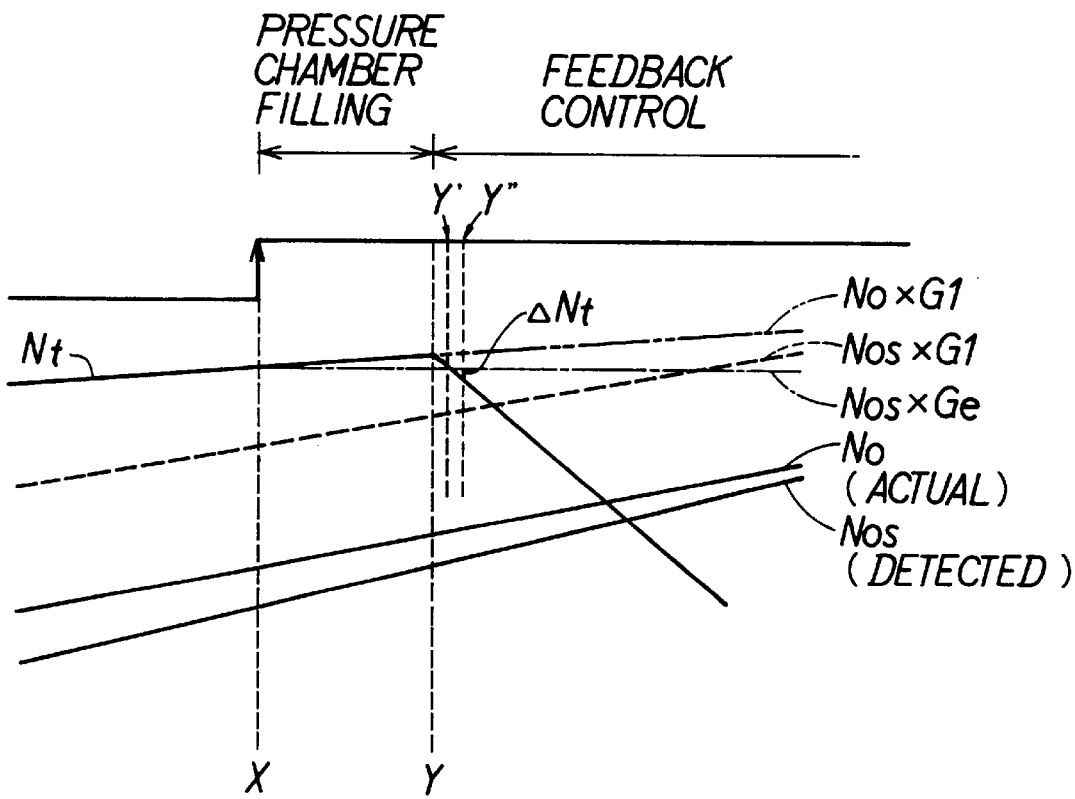
FIG. 7 is a timing chart illustrating the conditions of shift operation according to Embodiment 1.

Therefore, if the calculation Nos×G1−Nt of the starting point of the feedback control on the basis of the detected vehicle speed Nos as in the ideal conditions is performed, the determination as in the ideal conditions cannot be achieved, since the detected vehicle speed Nos will become considerably smaller than the input shaft rotational speed Nt as indicated by the broken line in FIG. 7.

To overcome this problem, this embodiment calculates the gear ratio Nt/Nos (=the effective gear ratio Ge) between the input shaft rotational speed Nt and the detected vehicle speed Nos at the time of occurrence of the shift instruction (indicated by point X in FIG. 7). If the effective gear ratio Ge is continually calculated from a moment to another, the calculated value gradually approaches the actual gear ratio G1. However, since the duration from the occurrence of the shift instruction (point X in FIG. 7) to the feedback control starting point (point Y in FIG. 7) is as short as about 100 ms or less, the change of the effective gear ratio Ge during that time period is sufficiently small so that assumption that the effective gear ratio Ge remains constant will not produce substantial error.

The effective gear ratio Ge, calculated at the occurrence of the shift instruction, is used to calculate a value Nos×Ge−Nt. The time point at which this value changes from zero to a positive value is determined as the time point to start feedback control (corresponding to point Y' in FIG. 7).

Actually, the time point that satisfies the following equation (2) is determined as the time point to start feedback control (point Y" in FIG. 7).

$$Nos \times Ge - Nt \geq \Delta Nt \qquad (2)$$

The value $\Delta Nt$ is determined within the range of about 50 to 150 rpm considering the response speed of the feedback control system. If the value $\Delta Nt$ is too small, the effect of electrical noise or fluctuation of detected speed data becomes too large. On the other hand, an excessively large value of $\Delta Nt$ will delay the time point to start feedback control.

Figure 8:
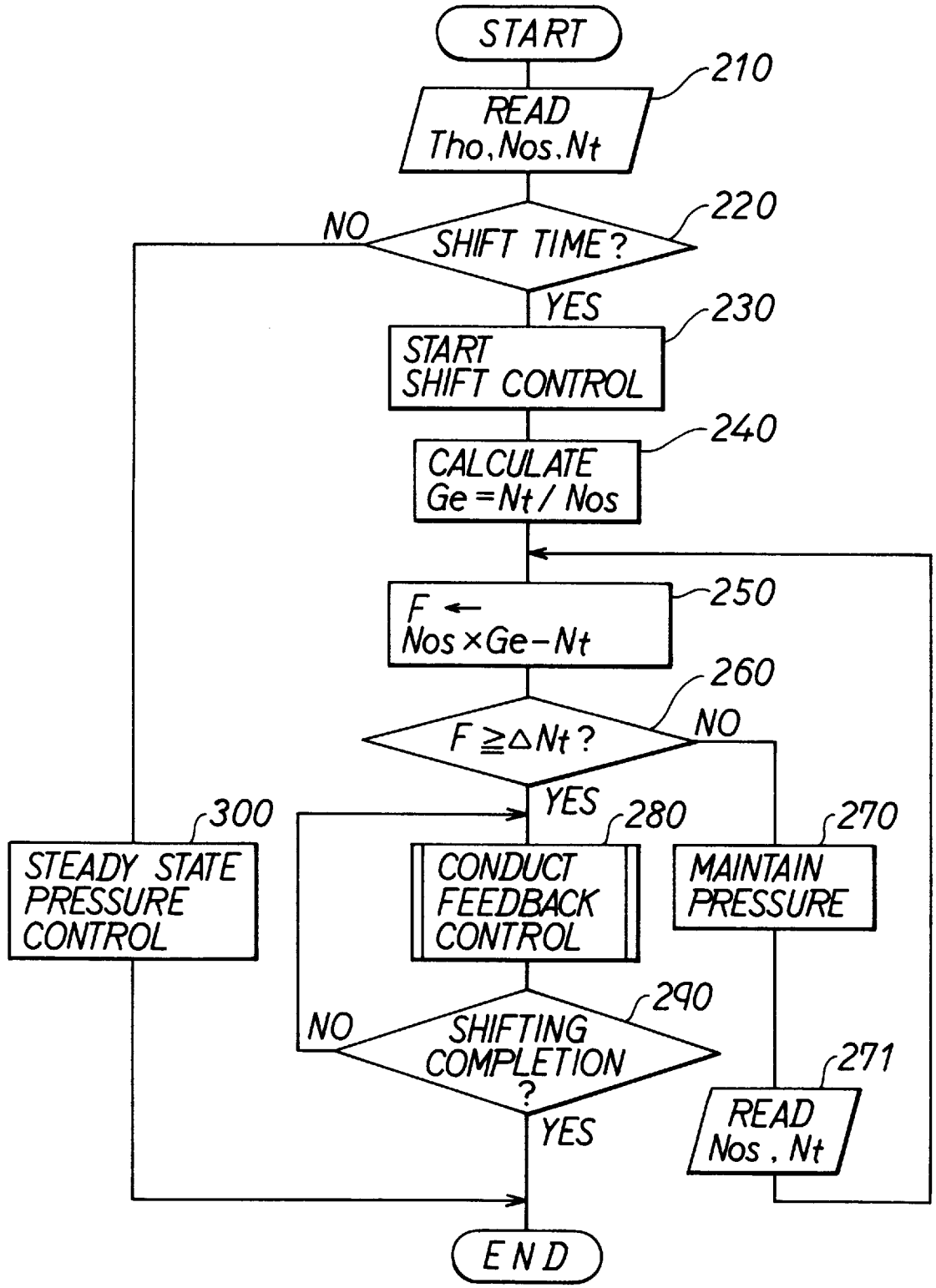
FIG. 8 is a flowchart illustrating a control operation by a shift control computer according to Embodiment 1.

The control operation performed by the shift control computer 14 to conduct the control described above will be described with reference to the flowchart of FIG. 8.

In step 210, the shift control computer 14 reads in the throttle valve opening Tho, the detected vehicle speed Nos, the rotational speed Nt of the input shaft 12 of the speed change gear mechanism 11 that are required for shift determination.

Subsequently, step 220 determines whether to perform shift on the basis of the shift diagrams of the map shown in FIG. 5. More specifically, it is determined that the shifting is required if the line extending between the point in the map determined by the vehicle speed No and the throttle valve opening Tho used for the previous calculation and the point determined by the vehicle speed No and the throttle valve opening Tho used for the current calculation crosses a shift criteria line indicated by the solid or broken line.

If step 220 determines that the shifting is required, the operation proceeds to step 230 to conduct the shift starting control. The shift starting control controls the energization/deenergization of the shift control solenoids 15a, 15b as shown in Table 1, and drives the line pressure control solenoids 16 on the basis of the duty value in accordance with the map of FIG. 6B, so as to provide a line pressure as indicated by the broken line in FIG. 6A.

Then, step 240 calculates the effective gear ratio Ge based on the input shaft rotational speed Nt and the detected vehicle speed Nos by using the equation (3):

$$Ge = Nt/Nos \qquad (3)$$

Step 250 calculates a parameter F indicating the time point to start feedback control based on the input shaft rotational speed Nt, the detected vehicle speed Nos and the effective gear ratio Ge by using equation (4):

$$F = Nos \times Ge - Nt \qquad (4)$$

Subsequently, step 260 compares in magnitude the starting point parameter F with a set value ΔNt for eliminating the effect of noise such as electrical noise or fluctuation of detected speed data.

If F<ΔNt is determined (i.e., NO), it is determined that the period for filling the hydraulic pressure chamber of the friction elements is not completed, and the operation proceeds to step 270. Step 270 maintains the hydraulic pressure occurring at the starting of shift by maintaining the duty value of the solenoid driving conditions that has been determined in step 230.

Subsequently, the operation proceeds to step 271 to read in the input shaft rotational speed Nt and the detected vehicle speed Nos again. The operation then returns to step 250.

On the other hand, if step 260 determines F≧ΔNt (YES), the operation proceeds to step 280 to conduct the feedback control so as to achieve a predetermined change of the rotational speed Nt of the input shaft 12.

The control in step 280 is repeatedly performed until step 290 determines that the shifting is completed. When the completion of the shifting is determined, this control operation temporarily ends.

In the case of up-shift (which has been assumed for this description), the determination regarding completion of the shifting in step 290 can be made by detecting a point where the changing direction of the input shaft rotational speed Nt is reversed, that is, the rotational speed Nt that has been decreasing with the progress of the shifting turns to increase. The determination can also be made by detecting a time point when the difference between the input shaft rotational speed Nt and the product of the detected vehicle speed Nos and the gear ratio of the gear unit of the speed change gear mechanism 11 that is undergoing the shifting becomes equal to or less than a predetermined value (for example, 50 rpm).

If step 220 determines that the shifting is not being performed, the operation proceeds to step 300 to determine the line pressure duty value for the non-shifting period in accordance with the map of FIG. 6, and to conduct the steady period line pressure control followed by the temporary end of the control operation.

According to this embodiment, the control apparatus calculates the effective gear ratio Ge based on the input shaft rotational speed Nt and the detected vehicle speed Nos at the shift instruction point X, instead of the mechanical gear ratio G1, and determines the time point to start feedback control based on the effective gear ratio Ge, the input shaft rotational speed Nt and the detected vehicle speed Nos that repeatedly varies. The embodiment thus achieves an advantage that the time point to start feedback control can be precisely determined.

Furthermore, since the embodiment determines the actual time point to start feedback control to a time point at which the starting point parameter F becomes equal to or greater than ΔNt, the embodiment achieves an advantage that the effect of noise or the like can be eliminated.

In addition, since the embodiment allows further precise line pressure control by suitably processing signals, the embodiment also achieves an advantage that there is no need to change the conventional arrangement of the sensors.

In short, the embodiment can perform appropriate hydraulic pressure control for the starting of shift, and can start the feedback control at an optimal time point, without requiring changes of the hardware construction.

(Embodiment 2)

The hardware construction or the like of this Embodiment 2 is substantially the same as that of Embodiment 1. The features distinguishing Embodiment 2 from Embodiment 1 will be described in detail.

Embodiment 2 determines a time point to start feedback control by the processing based on the effective gear ratio Ge as in Embodiment 1, but by using a different determination method for the effective gear ratio Ge.

According to Embodiment 1, the change of effective gear ratio Ge during the period from the occurrence of the shift instruction (point X in FIG. 7) to the feedback control starting point (point Y in FIG. 7) is ignored since that period is short. However, Embodiment 2 utilizes the maximum performance of the vehicle speed sensor 7 to more precisely follow the changes of the gear ratio.

More specifically, the effective gear ratio Ge (=Nt/Nos) is more precisely determined to the minimum value among the values obtained by repeatedly calculating effective gear ratio Ge during a predetermined length of time following the shift instruction. Based on the thus-determined effective gear ratio Ge, the control operation is conducted as in Embodiment 1.

The concept of determination of the effective gear ratio Ge is illustrated in FIGS. 9A1 through 9A5. FIG. 9A2 shows the output from the input shaft rotational sensor 17 (the input shaft rotational speed Nt) as analog values that approximate the ideal values. On the other hand, the output from the vehicle speed sensor 7 (the detected vehicle speed Nos) is indicated by a stepped line in FIG. 9A3, since the vehicle speed value is not updated during the long interval of pulses from the vehicle sensor 7.

The vehicle speed pulse interval decreases as the vehicle speed increases after the occurrence of the shift instruction shown in FIGS. 9A1 and 9B1. Therefore, the precision of detection of the vehicle speed sensor 7 effectively increases, and the effective gear ratio Ge approaches to the mechanical gear ratio G1 as shown in FIGS. 9A4 and 9B2. In addition, since the detected vehicle speed Nos varies stepwise, the effective gear ratio Ge also varies stepwise. Incidentally, Embodiment 1 employs an approximation where the envelope of the effective gear ratio Ge remains constant since the aforementioned time period is short.

According to Embodiment 2, the minimum value of the effective gear ratio Ge (=Nt/Nos) during the period T1 from the shift instruction point X to the feedback control starting point Y can be determined as the most precise value of the effective gear ratio Ge.

The effective gear ratio Ge is calculated by the following manner.

Since it has been found by experiments that the length of period T1 remains within the range of 130 to 150 msec, the effective gear ratio Ge is repeatedly calculated, for example, in a calculation cycle of 16 msec, during a period Ts (having a time length of 80 to 128 msec, for example, 96 msec) that is shorter than the period T1) as indicated in FIGS. 9B1 and 9B2. The minimum value is then determined as the effective gear ratio Ge.

Figure 10:
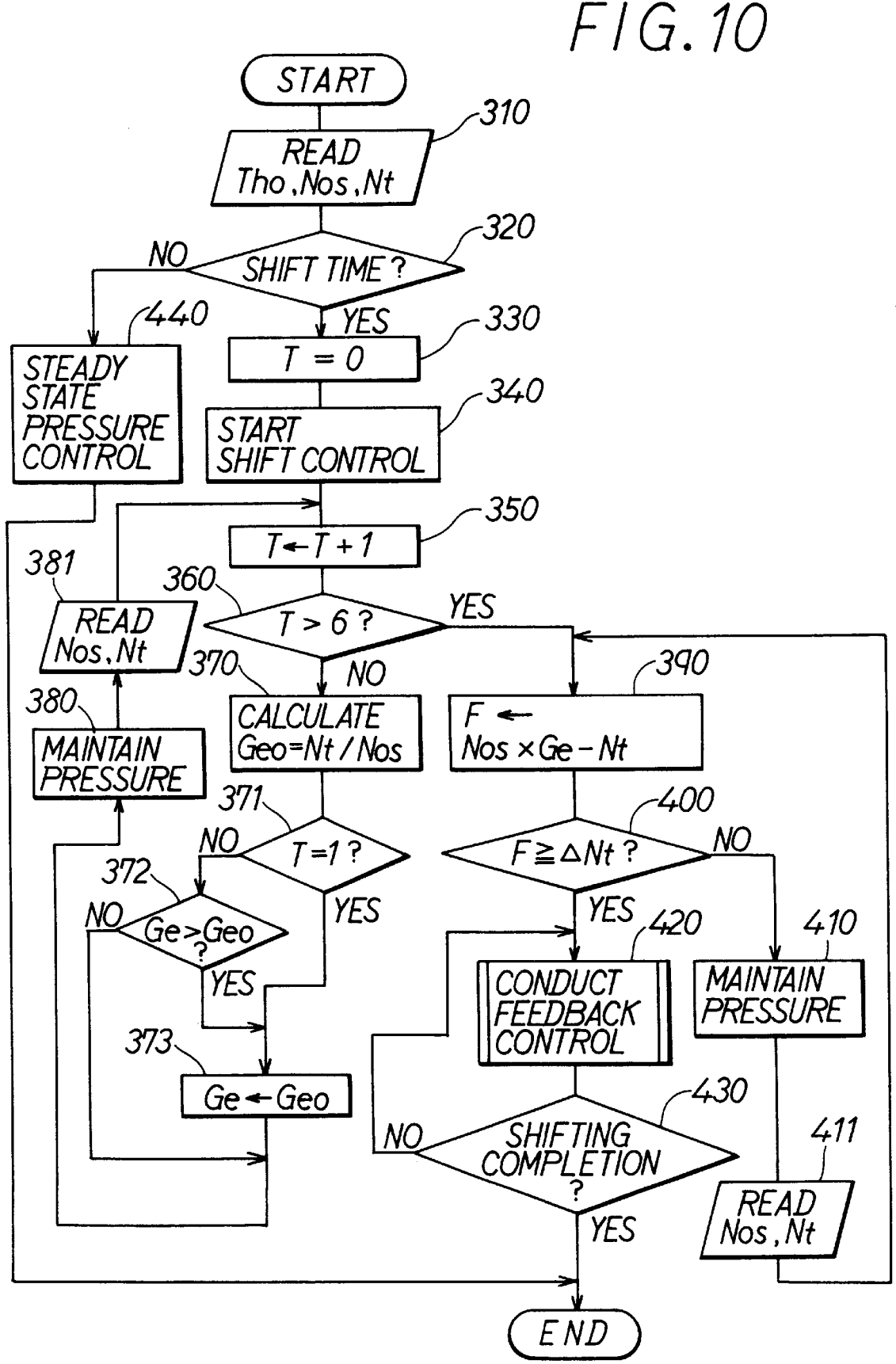
FIG. 10 is a flowchart illustrating a control operation by a shift control computer according to Embodiment 2.

The aforementioned operation will be described with reference to the flowchart of FIG. 10.

Step 310 reads in the throttle valve opening Tho, the detected vehicle speed Nos and the rotational speed Nt of the input shaft 12 of the speed change gear mechanism 11 that are required for determination regarding the shifting.

Subsequently, step 320 determines whether to perform the shifting in accordance with the shift diagram of the map shown in FIG. 5. If it is determined that the shifting is required, the operation proceeds to step 330 to clear a counter T.

Then, step 340 conducts the shift starting control as in step 230 of Embodiment 1, and step 350 increments the counter T. Step 360 determines whether the count value of the counter T exceeds a predetermined value 6. The value 6 is determined for the following circumstances. Assuming that the calculation of the effective gear ratio Ge is performed every 16 msec, six times 16 msec equals 96 msec, that is, the aforementioned period Ts. Thus, step 360 determines whether the period Ts has elapsed on the basis of the count value of the counter T.

If the period Ts has not elapsed, step 370 calculates a current effective gear ratio Geo (=Nt/Nos) on the basis of the input shaft rotational speed Nt and the detected vehicle speed Nos.

At step 371, it is determined whether the counter T value is 1 (i.e., first loop calculation) or not. If T=1 (YES), the current effective gear ratio Geo is substituted to the effective gear ratio Ge at step 373 and then the process proceeds to step 380. If T>1 (NO:the calculation is the second time or more) at step 371, on the other hand, the process proceeds to step 372.

Step 372 compares the effective gear ratio Ge calculated previously with the current effective gear ratio Geo. If Ge>Geo (YES) at step 372, step 373 substitutes the current effective gear ratio Geo into the effective gear ratio Ge. Repeating those steps a number of times (6times), a minimum value of the effective gear ratio Ge in a predetermined time interval is calculated.

After completing the step 373 or determining Ge<Geo (NO) in step 372, process proceeds to step 380. Subsequently, step 380 holds the initial hydraulic pressure, and step 381 reads in the input shaft rotational speed Nt and the detected vehicle speed Nos again.

Then, the operation returns to step 350 to increment the counter T.

If step 360 determines that the period Ts has elapsed, step 390 calculates the parameter F (=Nos×Ge−Nt) indicating the time point to start feedback control based on the input shaft rotational speed Nt, the detected vehicle speed Nos and the effective gear ratio Ge.

Subsequently, step 400 compares in magnitude the starting point parameter F with the set value ΔNt for eliminating the effect of electrical noise or fluctuation of detected data.

If F<ΔNt is determined (NO), it is determined that the period for filling the hydraulic pressure chamber of the friction elements is not completed, and the operation proceeds to step 410. Step 410 maintains the hydraulic pressure occurring at the starting of shift by maintaining the duty value of the solenoid driving conditions that has been determined in step 340.

Subsequently, the operation proceeds to step 411 to read in the input shaft rotational speed Nt and the detected vehicle speed Nos again. The operation then returns to step 390.

On the other hand, if step 400 determines F'≧ΔNt (YES), the operation proceeds to step 420 to conduct the feedback control so as to achieve a predetermined change of the rotational speed Nt of the input shaft 12.

The control in step 420 is repeatedly performed until step 430 determines that the shifting is completed. When the completion of the shifting is determined, this control operation temporarily ends.

If step 320 determines that the shifting is not being performed, the operation proceeds to step 440 to determine a line pressure duty value for a non-shifting period in accordance with the map of FIG. 6A, and to conduct the steady period line pressure control followed by the temporary end of the control operation.

According to this embodiment, the control apparatus calculates the effective gear ratio Ge every 16 msec until the period Ts elapses, and determines the time point to start feedback control based on the effective gear ratio Ge. The embodiment can thus determine the time point to start feedback control more precisely than Embodiment 1.

With this method of determining the effective gear ratio Ge, this embodiment avoids provision of a relatively large value of effective gear ratio Ge (which may occur in Embodiment 1), even if point Z near the peak of the sawtooth wave coincides in time with the shift instruction point X as indicated in FIGS. 9B1 and 9B2.

(Embodiment 3)

The hardware construction or the like of this Embodiment 3 is substantially the same as that of Embodiment 1. The features distinguishing Embodiment 3 will be described briefly.

This embodiment determines the effective gear ratio Ge to a mean value of the gear ratio values calculated during the period Ts.

Since the vehicle speed No varies stepwise even in proximate to the feedback control starting point, the detected vehicle speed Nos may be so small as to cause the incorrect determination on the basis of equation (5) depending on the timing of calculation.

$$Nos \times Ge - Nt \geq \Delta Nt \tag{5}$$

However, use of the mean value of the effective gear ratio Ge will reduce the effect of calculation error caused by the stepwise changing of the detected vehicle speed Nos, thus enabling the determination of a further precise timing of starting the feedback control.

Figure 11:
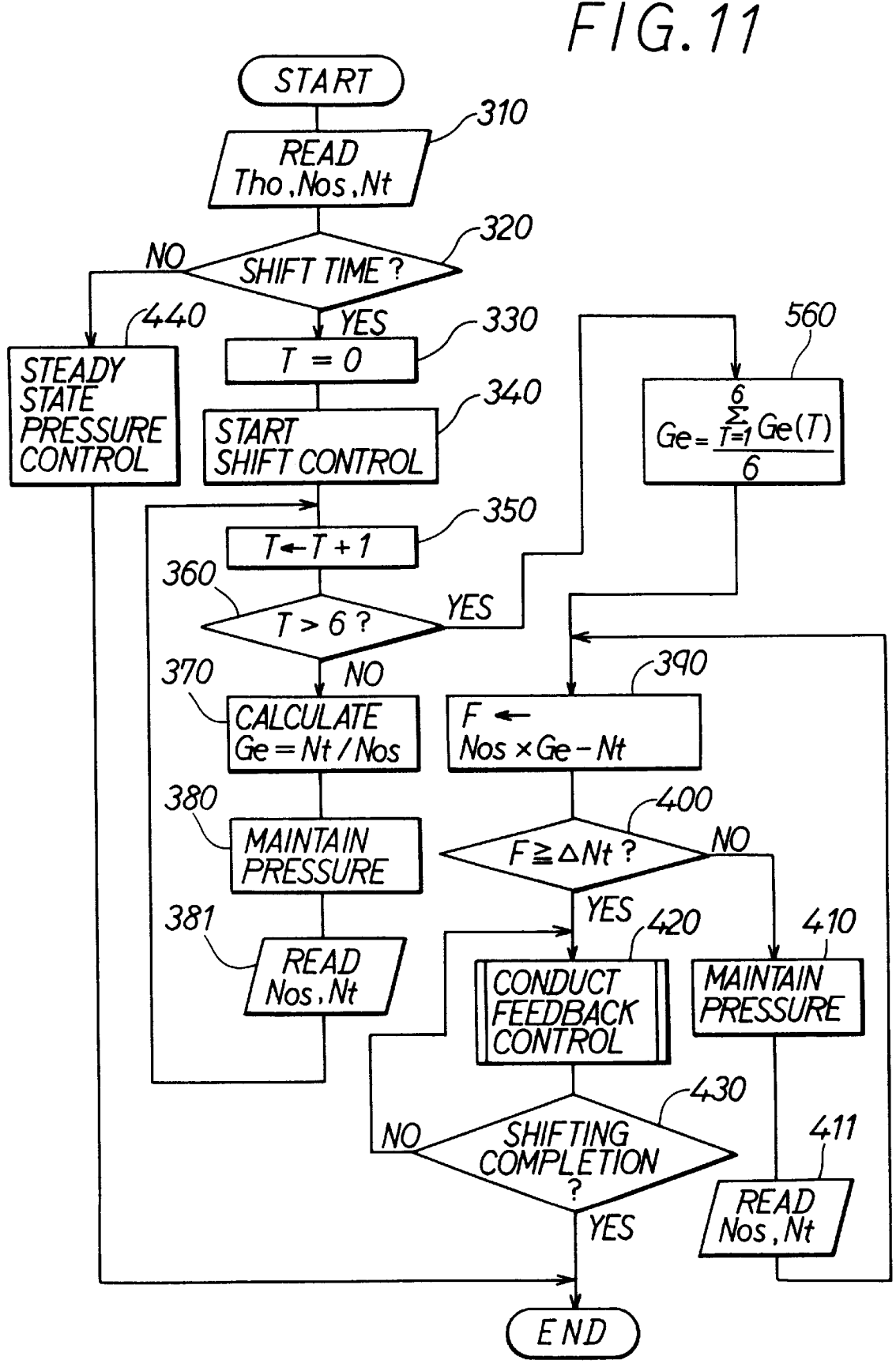
FIG. 11 is a flowchart illustrating a control operation by a shift control computer according to Embodiment 3.

According to the Embodiment 3, therefore, the control process of Embodiment 2 (FIG. 10) is modified as shown in FIG. 11, in which the same reference numerals are used to denote the same steps as in the Embodiment 2 for omitting further description for brevity. In FIG. 11, the process 380 is performed immediately after the step 370. In this step 370, a current effective gear ratio Ge(T)=Nt/Nos, where T=1, 2, —6, is calculated on the basis of the input shaft rotational speed Nt and the detected vehicle speed Nos. Step 560 is performed between the steps 360 and 390. That is, after the step 360 determines T>6 (YES) indicating that the period Ts has elapsed, the step 560 calculates the effective gear ratio Ge as the mean value of the gear ratios Ge(T) during the period Ts based on the following equation (6).

$$Ge=\{Ge(1)+Ge(2)+Ge(3)+Ge(4)+Ge\ (5)+Ge(6)\}/6 \tag{6}$$

According to this embodiment, the control apparatus calculates the current effective gear ratio Ge(T) every 16 msec until the period Ts elapses. Further, the effective gear ratio Ge is calculated by using the mean values of Ge(T) so that the time point to start feedback control is determined based on the effective gear ratio Ge. The embodiment can thus determine the time point to start feedback control more precisely than Embodiment 1.

It should be understood that the present invention is not limited to the disclosed embodiments but can be embodied in other various manners included within the spirit and scope of the appended claims.

What is claimed is:

1. A shifting period hydraulic pressure control apparatus for an automatic transmission which selectively operates friction elements of a speed change gear mechanism for gear shift operation by regulating hydraulic line pressure onto the friction elements, the apparatus comprising:

an input shaft rotational speed detector which detects rotational speed of an input shaft of the speed change gear mechanism;

an output shaft rotational speed detector which detects rotational speed of an output shaft of the speed change gear mechanism;

a shift start instructing unit which provides an instruction to start shift operation;

an effective gear ratio calculating unit which calculates an effective gear ratio at a time of providing the shift start instruction based on a ratio between the detected input shaft rotational speed and the detected output shaft rotational speed; and a feedback control starting point determining unit which determines a point to start feedback control for a shifting period based on the calculated effective gear ratio.

2. The apparatus according to claim 1, wherein:

the feedback control starting point determining unit determines the start point for feedback control to a point when a value obtained by subtracting the input shaft rotational speed from a product of the output shaft rotational speed and the effective gear ratio becomes greater than a predetermined value.

3. The apparatus according to claim 2, wherein:

the effective gear ratio calculating unit momentarily calculates a gear ratio that is a ratio between the input shaft rotational speed and the output shaft rotational speed during a predetermined time period after the shift operation is started by the shift starting instruction, and determines the effective gear ratio to a minimum value of the gear ratio calculated during the predetermined time period.

4. The apparatus according to claim 2, wherein:

the effective gear ratio calculating unit momentarily calculates a gear ratio that is a ratio between the input shaft rotational speed and the output shaft rotational speed value during a predetermined time period after the shift operation is started by the shift starting instruction, and determines the effective gear ratio to a mean value of the gear ratio calculated during said predetermined time period.

5. The apparatus according to claim 1, wherein:

the effective gear ratio calculating unit repeatedly calculates a gear ratio that is a ratio between the input shaft rotational speed and the output shaft rotational speed during a predetermined time period after the shift operation is started by the shift starting instruction, and determines the effective gear ratio to a minimum value of the gear ratio calculated during the predetermined time period.

6. The apparatus according to claim 1, wherein:

the effective gear ratio calculating unit repeatedly calculates a gear ratio that is a ratio between the input shaft rotational speed and the output shaft rotational speed value during a predetermined time period after the shift operation is started by the shift starting instruction, and determines the effective gear ratio to a mean value of the gear ratio calculated during said predetermined time period.

7. The apparatus according to claim 1, wherein:

the output shaft rotational speed detector produces less number of pulses for each rotation of the output shaft of the speed change gear mechanism than the input shaft rotational speed detector for each rotation of the input shaft of the speed change gear mechanism.

8. The shifting period hydraulic pressure control apparatus according to claim 1, wherein the detected output shaft rotational speed is different from an actual output shaft rotational speed.

9. The apparatus according to claim 1, wherein the effective gear ratio is different from a mechanical gear ratio of the automatic transmission, and the point to start feedback control for a shifting period is determined irrespective of the mechanical gear ratio.

* * * * *